Figure 1:
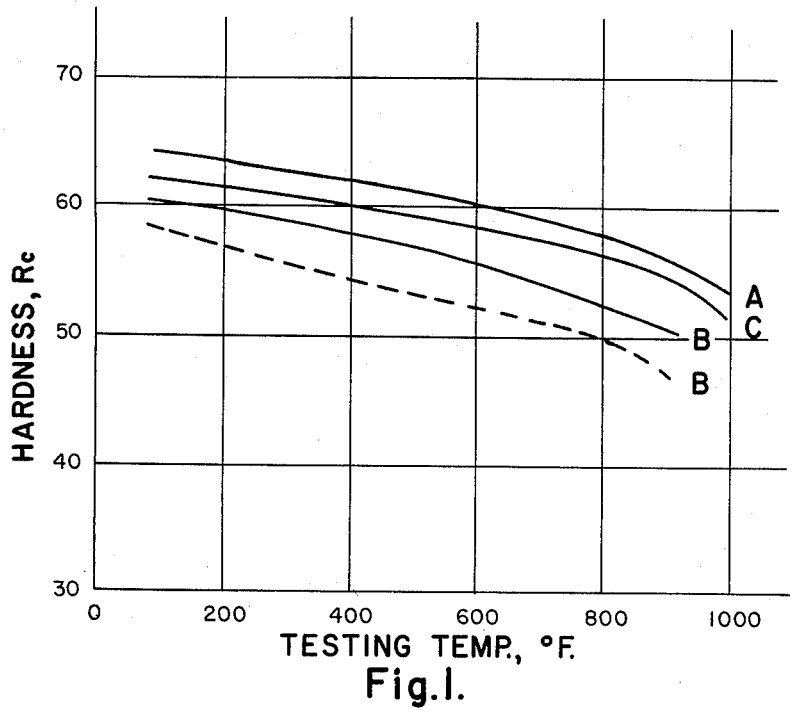

3,167,423
HIGH TEMPERATURE WEAR RESISTING STEELS
Birger L. Johnson, Jr., Ligonier, Pa., assignor to Latrobe Steel Company, a corporation of Pennsylvania
Filed Apr. 14, 1964, Ser. No. 360,484
9 Claims. (Cl. 75—126)

This application is a continuation-in-part of application Serial No. 861,859, filed December 24, 1959, and now abandoned.

This invention relates to high temperature wear resisting steels and, particularly, to a steel having hot hardness properties and corrosion resistance and adapted for use as bearings, cams, shafts, gears and the like at high temperatures in corrosive atmospheres. In this specification the use of the material as a bearing steel is illustrative of its use and the alloy will be specifically described in connection with this use. There are many materials which have been suggested for use as bearings and the like under various conditions; however, no bearing material heretofore available has been entirely satisfactory for high temperature use in corrosive atmospheres. In the past, Type 440–C stainless steel has been used. This material, however, lacked many characteristics desirable for this purpose. For example, in high temperature bearings Type 440–C, although used, did not have the desired hot hardness and wear resistance. Ordinary tool steels, on the other hand, which did have the desired hot hardness and wear resistance did not have the necessary corrosion resistance. It was, accordingly, the practice to use Type 440–C where corrosion appeared to be the most usual cause of bearing failures, hot hardness and wear resistance being sacrificed and not available; and to use various types of high speed steel for applications where hot hardness and wear resistance appeared to be the controlling factors.

I have discovered an alloy which has all of the properties necessary for high temperature bearing use. My alloy has corrosion resistance at high temperatures, as well as hot hardness and wear resistance comparable to high speed steels. In addition the alloy of this invention has the characteristics of ductility and toughness necessary for rolling, forging and machining so that it may be readily formed and then heat treated to the final high hardness and will resist breakage under impact loading in operation. In a preferred composition the alloy consists of:

| | |
|---|---|
| Carbon | About 0.95% to 1.5%. |
| Silicon | 0.95% maximum. |
| Manganese | 1% maximum. |
| Chromium | About 13% to 19%. |
| Vanadium | About 0.5% to 2.5%. |
| Molybdenum | About 3.5% to 4.5%. |
| Sulphur | About 0.025% maximum. |
| Phosphorus | About 0.025% maximum. |
| Iron with residual impurities in ordinary amounts | Balance. |

Preferably, however, I maintain the composition of the alloy within the following narrow range:

| | |
|---|---|
| Carbon | About 1.1% to 1.2%. |
| Silicon | About 0.2% to 0.4%. |
| Manganese | About 0.4% to 0.6%. |
| Chromium | About 14% to 16%. |
| Vanadium | 1% to 2%. |
| Molybdenum | 3.5% to 4.5%. |
| Sulphur | 0.025% maximum. |
| Phosphorus | 0.025% maximum. |
| Iron with residual impurities in ordinary amounts | Balance. |

A single preferred composition would have the range:

| | |
|---|---|
| Carbon | About 1.1%. |
| Silicon | About 0.3%. |
| Manganese | About 0.5%. |
| Chromium | About 14.5%. |
| Vanadium | About 1%. |
| Molybdenum | About 4.25%. |
| Sulphur | 0.025% maximum. |
| Phosphorus | 0.025% maximum. |
| Iron with residual impurities in ordinary amounts | Balance. |

I have made comparative tests of the hot hardness of the alloy of this invention as compared with a typical 440 stainless steel and a tool steel which has been used for bearings. The compositions of these three test steels are as follows:

The alloy of this invention (identified as A):

| | Percent |
|---|---|
| Carbon | 1.09 |
| Silicon | 0.30 |
| Manganese | 0.50 |
| Chromium | 14.8 |
| Molybdenum | 4.25 |
| Vanadium | 1.01 |

A typical 440 stainless (identified as B):

| | |
|---|---|
| Carbon | 1.05 |
| Silicon | 0.40 |
| Manganese | 0.40 |
| Chromium | 17.25 |
| Molybdenum | 0.50 |

A typical tool steel (identified as C):

| | |
|---|---|
| Carbon | 0.80 |
| Silicon | 0.25 |
| Manganese | 0.25 |
| Chromium | 4.10 |
| Vanadium | 1.10 |
| Molybdenum | 4.25 |

The three steels identified above were treated by oil quenching from 2,000° F., tempered, refrigerated at minus 100° F., and tempered again (2+2 hours). The final tempering treatment was at 1,000° F. for alloys A and C and at 900° F. for alloy B. The samples were then placed in a specially designed electric furnace attached to a standard Rockwell hardness test machine so that there was complete equalization of temperature throughout the specimen, the furnace anvil base, the indentor and the surrounding protective nitrogen atmosphere. The hardness at various elevated temperatures is shown by the solid curves in the accompanying graph (FIG. 1).

It will be seen from the accompanying graph (FIG. 1) that there is a marked improvement in elevated temperature hardness in my composition over both 440 stainless (alloy B) and the tool steel commonly used as a bearing steel (alloy C) at elevated temperature. Corrosion tests show that the alloy of my invention is substantially equivalent to the 440 stainless in resistance to corrosion and is far superior to the tool steel alloy identified as C.

It should be pointed out that, although the 440 stainless was hardened from 2,000° F. in order to afford a direct comparison with the other two steels similarly hardened, the usual recommended hardening temperature for this type of steel is about 1,900° F. This treatment results in much lower hot hardness values, as shown by the dashed curve on the accompanying graph (FIG. 1) which represents alloy B oil quenched from 1,900° F., tempered, refrigerated at minus 100° F., and tempered at 900° F. (2+2 hours).

Figure 2:
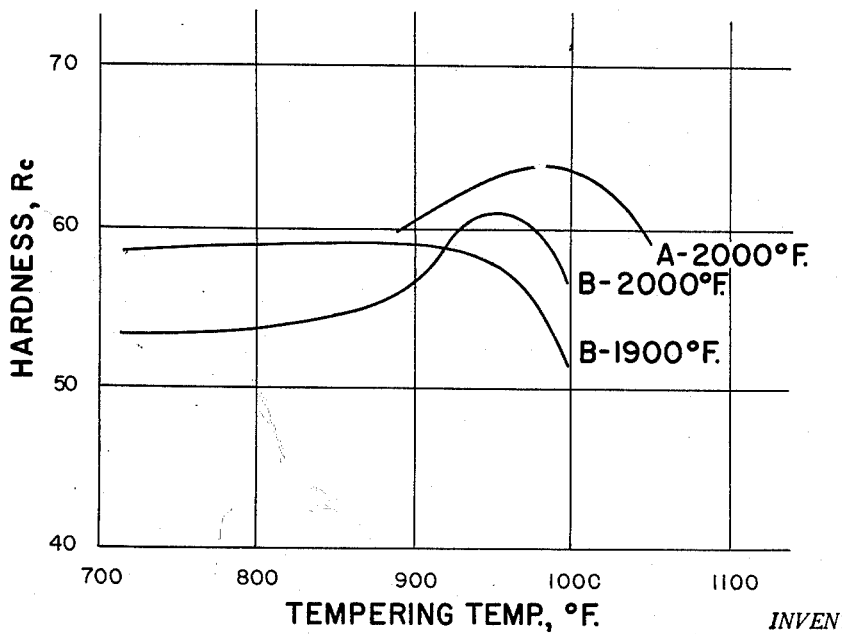

It should also be pointed out that alloy B of FIG. 1 was tempered at 900° F. compared to 1,000° F. for alloys A and C. These are the tempering temperatures which produce maximum hot hardness properties in the respective alloys. It is an important feature of the alloy of my invention that it attains maximum room temperature hardness, and correspondingly maximum hot hardness properties, after tempering at relatively high temperatures. This feature is shown by the accompanying graph (FIG. 2) where room temperature hardness is plotted as a function of tempering temperature for alloy A hardened from 2,000° F. and alloy B hardened from both 1,900° F. and 2,000° F. The samples in this case were oil quenched from the hardening temperature, tempreed at the indicated tempering temperature, refrigerated at minus 100° F. and retempered at the initial tempering temperature. Other combinations of tempering and refrigeration, such as refrigeration between the quench and the first temper, produce similar hardness relationships between alloys A and B. The superior resistance to softening of the alloy of this invention permits its use for bearings and similar parts at higher operating temperatures than is practical with corrosion resistant steels, such as the 440 type, heretofore available.

The alloy of the present invention provides a solution to the bearing problems of the high speed aircraft industry and similar industries where bearings having high hardness and resistance to corrosion at elevated temperatures are required.

While I have described certain preferred embodiments of my invention in the foregoing disclosure, it will be understood that this invention may be otherwise embodied within the scope of the following claims.

I claim:

1. A wear resisting steel having desirable properties of hot hardness and resistance to corrosion comprising carbon about 0.95% to about 1.5%, silicon about 0.95% maximum, manganese about 1% maximum, chromium about 13% to about 19%, vanadium about 0.5% to about 2.5%, molybdenum about 3.5% to about 4.5%, sulphur about 0.025% maximum, phosphorus about 0.025% maximum, and the balance iron with residual impurities in ordinary amounts.

2. A wear resisting steel having desirable properties of hot hardness and resistance to corrosion comprising carbon about 1.1% to about 1.2%, silicon about 0.2% to about 0.4%, manganese about 0.4% to about 0.6%, chromium about 14% to about 16%, vanadium about 1% to about 2.0%, molybdenum about 3.5% to about 4.5%, sulphur about 0.025% maximum, phosphorus about 0.025% maximum, and the balance iron with residual impurities in ordinary amounts.

3. A wear resisting steel having desirable properties of hot hardness and resistance to corrosion comprising carbon about 1.1%, silicon about 0.3%, manganese about 0.5%, chromium about 14.5%, vanadium about 1%, molybdenum about 4.25%, sulphur about 0.025% maximum, phosphorus about 0.025% maximum, and the balance iron with residual impurities in ordinary amounts.

4. A ferrous alloy bearing comprising about 0.95% to about 1.5% carbon, silicon about 0.95% maximum, manganese about 1% maximum, chromium about 13% to about 19%, vanadium about 0.5% to about 2.0%, molybdenum about 3.5% to about 4.5%, sulphur about 0.025% maximum, phosphorus about 0.025% maximum, and the balance iron with residual impurities in ordinary amounts, said bearing being characterized by both hot hardness and resistance to corrosion at elevated temperatures.

5. A ferrous alloy bearing comprising about 1.1% to about 1.2% carbon, silicon about 0.2% to about 0.4%, manganese about 0.4% to about 0.6%, chromium about 14% to about 16%, vanadium about 1% to about 2.0%, molybdenum about 3.5% to about 4.5%, sulphur about 0.025% maximum, phosphorus about 0.025% maximum, and the balance iron with residual impurities in ordinary amounts, said bearing being characterized by both hot hardness and resistance to corrosion at elevated temperatures.

6. A ferrous alloy bearing comprising about 1.1% carbon, silicon about 0.3%, manganese about 0.5%, chromium about 14.5%, vanadium about 1%, molybdenum about 4.25%, sulphur about 0.025% maximum, phosphorus about 0.025% maximum, and the balance iron with residual impurities in ordinary amounts, said bearing being characterized by both hot hardness and resistance to corrosion at elevated temperatures.

7. A ferrous alloy article comprising about 0.95% to about 1.5% carbon, silicon about 0.95% maximum, manganese about 1% maximum, chromium about 13% to about 19%, vanadium about 0.5% to about 2.0%, molybdenum about 3.5% to about 4.5%, sulphur about 0.025% maximum, phosphorus about 0.025% maximum, and the balance iron with residual impurities in ordinary amounts, said article being characterized by both hot hardness and resistance to corrosion at elevated temperatures.

8. A ferrous alloy article comprising about 1.1% to about 1.2% carbon, silicon about 0.2% to about 0.4%, manganese about 0.4% to about 0.6%, chromium about 14% to about 16%, vanadium about 1% to about 2.0%, molybdenum about 3.5% to about 4.5%, sulphur about 0.025% maximum, phosphorus about 0.025% maximum, and the balance iron with residual impurities in ordinary amounts, said article being characterized by both hot hardness and resistance to corrosion at elevated temperatures.

9. A ferrous alloy article comprising about 1.1% carbon, silicon about 0.3%, manganese about 0.5%, chromium about 14.5%, vanadium about 1%, molybdenum about 4.25%, sulphur about 0.025% maximum, phosphorus about 0.025% maximum, and the balance iron with residual impurities in ordinary amounts, said article being characterized by both hot hardness and resistance to corrosion at elevated temperatures.

References Cited by the Examiner
UNITED STATES PATENTS

| | | | |
|---|---|---|---|
| 1,815,613 | 7/31 | Comstock | 75—126 |
| 2,709,132 | 5/55 | Giles | 75—126 |
| 2,939,430 | 4/60 | Klaybor et al. | 75—126 |

DAVID L. RECK, *Primary Examiner.*